United States Patent [19]

Pedronno et al.

[11] Patent Number: 5,676,423

[45] Date of Patent: Oct. 14, 1997

[54] BACKREST ARMATURE DEVICE FOR MOTOR VEHICLE REAR SEAT, AND SEAT INCLUDING SUCH A DEVICE

[75] Inventors: Philippe Pedronno, Marcoussis; Bernard Denis, Gretz-Armainvilliers, both of France

[73] Assignee: Bertrand Faure Equipments SA, Boulogne, France

[21] Appl. No.: 644,845

[22] Filed: May 9, 1996

[30] Foreign Application Priority Data

May 11, 1995 [FR] France .................................. 95 05589

[51] Int. Cl.$^6$ ........................................................ B60N 2/02
[52] U.S. Cl. ............................ 297/378.1; 297/452.18; 297/452.2; 297/378.13
[58] Field of Search ........................ 297/378.1, 378.12, 297/378.13, 452.18, 452.2, 474, 216.13, 216.14; 296/65.1

[56] References Cited

U.S. PATENT DOCUMENTS

| | | |
|---|---|---|
| 2,955,644 | 10/1960 | Kramer ........................ 297/452.2 X |
| 4,493,505 | 1/1985 | Yamawaki . |
| 4,572,569 | 2/1986 | Habmann ........................ 297/378.13 X |
| 4,721,338 | 1/1988 | Kondo ................................ 297/378.13 |
| 5,273,336 | 12/1993 | Schubring et al. ............... 297/378.1 X |
| 5,509,716 | 4/1996 | Kelena et al. ................... 297/452.18 X |
| 5,575,533 | 11/1996 | Glance .............................. 297/452.2 |

FOREIGN PATENT DOCUMENTS

| | | |
|---|---|---|
| 0 197 167 | 10/1986 | European Pat. Off. . |
| 42 30 538 | 3/1994 | Germany . |
| 94 02 769.2 | 4/1994 | Germany . |

*Primary Examiner*—Laurie K. Cranmer
*Attorney, Agent, or Firm*—Larson & Taylor

[57] ABSTRACT

A backrest armature device for a motor vehicle rear seat having two frames which can be folded down independently of one another, each frame including at least a back panel, a horizontal lower beam which is formed in a steel having an elastic limit above 1100 MPa, at least two lateral uprights formed in a steel having an elastic limit which is at most equal to the elastic limit of the lower beam and which is above 450 MPa, and a horizontal upper beam formed in a steel having an elastic limit which is at most equal to the elastic limit of the uprights and which is above 400 MPa.

10 Claims, 1 Drawing Sheet

BACKREST ARMATURE DEVICE FOR MOTOR VEHICLE REAR SEAT, AND SEAT INCLUDING SUCH A DEVICE

FIELD OF THE INVENTION

The present invention relates to backrest armature devices for vehicle rear seats, and to the seats which include such devices.

More particularly, the invention relates to a backrest armature device for a motor vehicle rear seat, including first and second frames which can be folded down independently of one another about a horizontal axis, each of these frames having a first lateral edge which is provided with attachment means for fixing to the body of the vehicle and a second lateral edge which is contiguous with the other frame and which is devoid of such attachment means, each frame including a rigid framework which is integral with a rigid and substantially solid back panel, and the first frame having a horizontal length which is greater than the second frame.

BACKGROUND OF THE INVENTION

Known backrest armature devices of this type generally have the drawback of having insufficient strength in the event of a vehicle accident, particularly if the vehicle runs into an obstacle at the front, and if the trunk of the vehicle contains heavy luggage.

What happens is that this luggage then crashes into the backrest of the rear seat and runs the risk of deforming the armature device of this backrest, or even of causing it to break, because each of the frames constituting the armature device is fastened to the body of the vehicle by Just one of its lateral edges.

In order to alleviate these drawbacks, a known solution is to produce backrest armature devices from steel strips which are very strong, but the mass of which is particularly high. The result of this is that these armature devices are expensive, they penalize the total mass of the vehicle. In addition, in the event of an impact, and as a direct result of their very mass, they put a great deal of stress on the attachment systems which connect them to the body of the vehicle, so that these attachment systems have themselves to be specially reinforced.

In order to remove the aforementioned drawbacks, the production of each of the frames of the armature of the backrest in synthetic resin is also known, but in this case the cost of this armature is extremely high.

OBJECT AND BRIEF SUMMARY OF THE INVENTION

The object of the present invention is in particular to overcome the aforementioned drawbacks without appreciably increasing the mass of the armature device by comparison with conventional armature devices of the prior art, and at a cost which is not appreciably greater than the cost of these conventional armature devices.

To this end, according to the invention, an armature device of the sort in question is essentially one wherein at least the framework of the first frame includes:

a horizontal lower beam which is formed in a steel having an elastic limit above 1100 MPa, at least first and second uprights which are arranged close to the two lateral edges of the frame substantially perpendicular to the lower beam, these uprights being fixed to the lower beam and being formed in a steel having an elastic limit which is at most equal to the elastic limit of the lower beam and which is above 450 MPa, and a horizontal upper beam which is fixed to the uprights, this upper beam being formed in a steel having an elastic limit which is at most equal to the elastic limit of the uprights and which is above 400 MPa.

By virtue of these provisions, each constituent element of the framework works in an optimum fashion in the event of the luggage impacting against the rear of the backrest, so that the backrest therefore undergoes minimum deformation, without the armature device being in any way either especially heavy or especially expensive.

In preferred embodiments of the armature device defined hereinabove, recourse is further had to one and/or other of the following provisions:

the framework of the second frame also includes
   a horizontal lower beam which is formed in a steel having an elastic limit above 1100 MPa,
   at least first and second uprights which are arranged close to the two lateral edges of the frame substantially perpendicular to the lower beam, these uprights being fixed to the lower beam and being formed in a steel having an elastic limit which is at most equal to the elastic limit of the lower beam and which is above 450 MPa,
   and a horizontal upper beam which is fixed to the uprights, this upper beam being formed in a steel having an elastic limit which is at most equal to the elastic limit of the uprights and which is above 400 MPa;

the framework of the first frame includes a third upright which is arranged between the first and second uprights substantially parallel thereto, the third upright being fixed to the lower beam and upper beam and being formed in a steel having an elastic limit which is at most equal to the elastic limit of the lower beam, which is at least equal to the elastic limit of the upper beam, and which is above 450 MPa;

the upper beam includes a flat which stretches along said upper beam and which forms an angle of less than 30 degrees with the mean plane of the frame to which said upper beam belongs, and at least one pair of tubular metal sockets is welded to the flat in order to take a pair of rods supporting a head restraint, each of the tubular sockets being arranged longitudinally in a vertical plane;

the upper beam includes a substantially flat lower face and the lower beam has a substantially flat upper face, these upper and lower faces being parallel to one another, and the uprights each having two axial ends which are welded respectively to said lower face and said upper face;

the lower beam and the upper beam together with the uprights consist of tubular sections.

Moreover, another subject of the invention is a motor vehicle rear seat having a seat cushion and a backrest, the backrest including an armature device as defined hereinabove.

In preferred embodiments of this seat, recourse is further had to one and/or other of the following provisions:

the seat includes three safety belts, namely two lateral safety belts and a central safety belt, this central safety belt having an upper part which is connected to the first frame by at least one anchoring point: these provisions, which make it possible easily to provide a safety belt with three anchoring points for the central seating position on the rear seat are permitted by virtue of the exceptionally high strength of the armature device according to the invention;

the first frame includes a front face covered by a foam covering and a rear face to which is fixed a belt winder which constitutes the aforementioned anchoring point, the upper part of the central safety belt stretching upward from said winder, passing over the upper beam bearing against said beam and extending downward beyond the upper beam, this upper beam having a bearing surface which is its only surface in contact with said upper part of the central safety belt, and this bearing surface having no sharp edges: these provisions are specially advantageous, particularly by comparison with known rear seats in which the central safety belt has a winder which is fixed to the body of the vehicle on one of the sides of the vehicle, in which case the central safety belt has to be particularly long;

the bearing surface has, at every point in contact with the upper part of the central safety belt, a radius of curvature greater than two centimeters.

BRIEF DESCRIPTION OF THE DRAWINGS

Further features and advantages of the invention will become clear during the course of the following detailed description of one of its embodiments, given by way of nonlimiting example with reference to the appended drawings.

In the drawings.

MORE DETAILED DESCRIPTION

In the various figures, the same references denote identical or similar elements.

Figure 1:
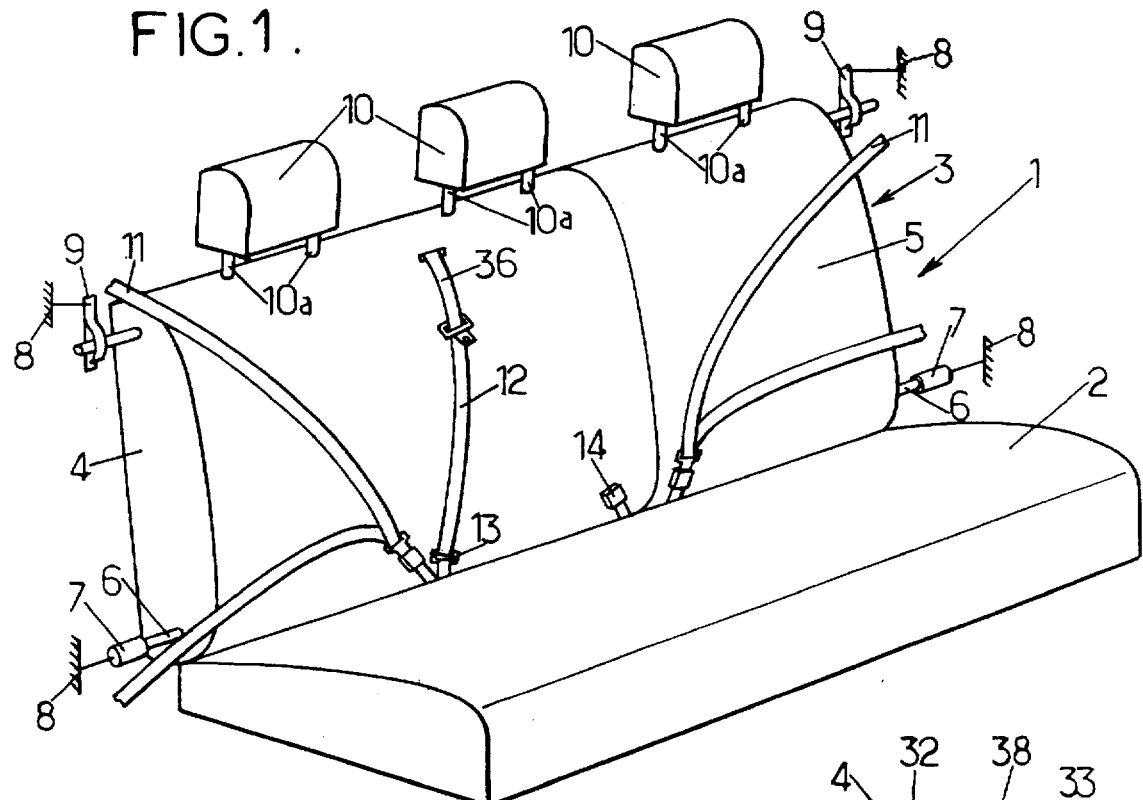
FIG. 1 is a perspective diagrammatic view of a motor vehicle rear seat according to one embodiment of the invention.

FIG. 1 represents a motor vehicle rear bench or seat 1 including a seat cushion 2 and a backrest 3.

The backrest 3 includes two juxtaposed parts 4 and 5 which form respectively about ⅔ and about ⅓ of the length of the bench, although these proportions are not in any way limiting.

In order to allow the trunk at the back of the vehicle to communicate with the passenger space, the two parts 4 and 5 of the backrest can be folded down independently of one another about a horizontal axis which may be concretely embodied especially by pivots 6. These pivots are mounted in bearings 7 or the like which are integral with the body 8 of the vehicle.

The two parts 4 and 5 of the backrest may furthermore be locked independently of one another to the body 8 of the vehicle by means of locks 9 (represented very diagrammatically) which are arranged at the two longitudinal ends of the bench, at the upper part of the backrest.

The result of this is that each of the parts 4 and 5 of the backrest can be locked to the body 8 of the vehicle via just one of its lateral edges, the other lateral edge not being fixed to an external element at its upper part.

In the example represented in FIG. 1, the backrest 3 is furthermore equipped with head restraints 10, of which there may be two or three and which are each supported by two metal rods 10a.

In addition, the bench I includes three safety belts, namely two lateral safety belts 11 which are intended for the occupants of the main seating positions on the bench, and a central safety belt 12 which is intended for the occupant of the central seating position on the rear bench.

As will be explained in greater detail herein-below, the central safety belt 12 emerges from the upper part of the backrest 3 and it further includes a fixed lower anchoring point 13 and a lower anchoring point 14 provided with a lock to allow the belt to be fastened.

Figure 3:
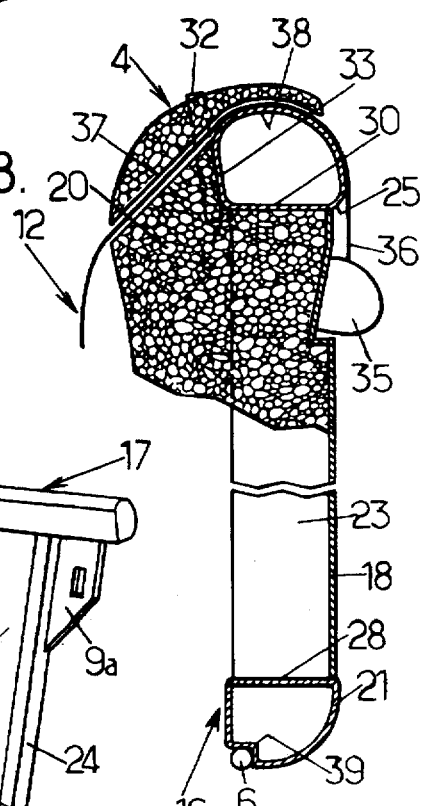
FIG. 3 is a view in vertical section through one of the two frames constituting the armature device of FIG. 2.
Figure 2:
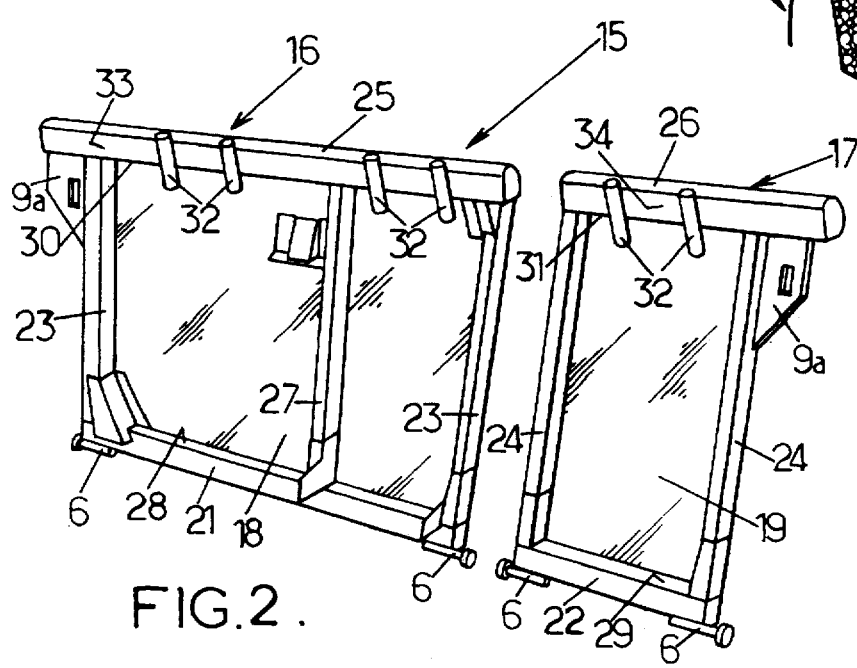
FIG. 2 is a perspective diagrammatic view of a backrest armature device for the seat in FIG. 1.

As may be seen in FIGS. 2 and 3, the backrest 3 includes an armature device 15 which consists of first and second rigid frames 16, 17 corresponding respectively to the two parts 4, 5 of the backrest.

Each of the frames 16, 17 includes a back panel 18, 19 respectively which is fixed to a rigid framework and which has, on the one hand, a front face covered by a foam covering 20 and, on the other hand, a rear face directed generally toward the trunk of the vehicle.

The back panel 18, 19 is a substantially rigid and substantially solid thin panel. This panel is made of metal or possibly of synthetic material and it is generally plastically deformable under the effect of a violent impact of heavy luggage contained in the trunk, in the event of an accident of the vehicle.

The rigid framework of each frame, for its part, includes:

a horizontal lower beam, respectively 21, 22, which is formed in a steel having an elastic limit above 1100 MPa, at least two lateral uprights, respectively 23, 24, which form the respective lateral edges of the frames and which stretch substantially perpendicular to the lower beam, these uprights being fixed by their lower end to the lower beam and being formed in a steel having an elastic limit which is at most equal to the elastic limit of the lower beam and which is above 450 MPa, and a horizontal upper beam, respectively 25, 26, which is fixed to the upper end of the lateral uprights, respectively 23, 24, this upper beam being formed in a steel having an elastic limit which is at most equal to the elastic limit of the lateral uprights and which is above 400 MPa.

It will be noted that the beams 22, 26 and the uprights 24 of the second frame 17 may be made in steels which have strengths lower than those mentioned hereinabove, because the second frame 17 is not as long as the first frame 16.

In each frame, the lateral upright respectively 23, 24 which is arranged toward the outside of the bench has a member 9a intended for attaching the frame to the body of the vehicle in the up position. These members 9a may belong directly to the aforementioned locks 9, or alternatively they may simply constitute supports for part of each lock 9.

In addition, the framework of the first frame 16, which is the longer one, includes an intermediate upright 27 which stretches between the lower beam 21 and upper beam 25 of this frame, and the two axial ends of which are fixed to said beams. This intermediate upright is preferably formed in the same steel as the lateral uprights 23.

The upper and lower beams and the uprights of the frameworks of the two frames are preferably formed of tubular sections.

Advantageously, to make it easier for the uprights to be assembled with the lower and upper beams, especially when this assembly takes place by welding:

the lower beams 21, 22 preferably include a substantially flat upper face, respectively 28, 29, the upper beams 25, 26 preferably include a substantially flat lower face, respectively 30, 31, and said opposing faces, respectively 28, 30 and 29, 31, are arranged parallel to one another being welded to the axial ends of the uprights 23, 24, 27.

Furthermore, to make it easier for the tubular meal sockets 32 for accommodating the rods 10a of the head restraints to be fitted, each upper beam 25, 26 include a substantially flat front face, respectively 33, 34, which may, for example, be inclined slightly upward and forward relative to the mean plane of the corresponding frame, this inclination generally being less than 30 degrees.

In this way, the tubular sockets 32 may simply be welded to the front faces 33, 34 of the upper beams, each tubular socket 32 being arranged in a vertical plane.

Furthermore, as may be seen particularly in FIG. 3, the upper anchoring point of the central safety belt 12 preferably consists of a winder 35 which is fixed to the rear of the first frame 16, and especially on the rear face of the back panel 18 of this frame.

Starting from the winder 35, the strap 36 of the central safety belt stretches upward, then it passes over the upper beam 25 of the first frame and it continues beyond this upper beam 25 downward and toward the lower anchoring point 13, for example passing through a passage 37 formed in the covering 20 of the backrest.

The surface 38 of the upper beam 30 which is in direct contact with the strap 36 preferably has no sharp edges, and advantageously has a radius of curvature which at every point is greater than two centimeters.

Finally, each lower beam 21, 22 preferably includes, at least toward its axial ends, pressings 39 which take the pivots 6 and allow these pivots to be welded to the lower beams.

We claim:

1. A backrest armature device for a motor vehicle rear seat, including first and second frames which can be folded down independently of one another about a horizontal axis, each of these frames having a first lateral edge which is provided with attachment means for fixing to the body of the vehicle and a second lateral edge which is contiguous with the other frame and which is devoid of such attachment means, each frame including a rigid framework which is integral with a rigid and substantially solid back panel, and the first frame having a horizontal length which is greater than the second frame, wherein at least the framework of the first frame includes:

a horizontal lower beam which is formed in a steel having an elastic limit above 1100 MPa, at least first and second uprights which are arranged close to the two lateral edges of the frame substantially perpendicular to the lower beam, these uprights being fixed to the lower beam and being formed in a steel having an elastic limit which is at most equal to the elastic limit of the lower beam and which is above 450 MPa, and a horizontal upper beam which is fixed to the uprights, this upper beam being formed in a steel having an elastic limit which is at most equal to the elastic limit of the uprights and which is above 400 MPa.

2. The device as claimed in claim 1, in which the framework of the second frame also includes:

a horizontal lower beam which is formed in a steel having an elastic limit above 1100 MPa, at least first and second uprights which are arranged close to the two lateral edges of the frame substantially perpendicular to the lower beam, these uprights being fixed to the lower beam and being formed in a steel having an elastic limit which is at most equal to the elastic limit of the lower beam and which is above 450 MPa, and a horizontal upper beam which is fixed to the uprights, this upper beam being formed in a steel having an elastic limit which is at most equal to the elastic limit of the uprights and which is above 400 MPa.

3. The device as claimed in claim 1, in which the framework of the first frame includes a third upright which is arranged between the first upright and second upright substantially parallel thereto, the third upright being fixed to the lower beam and upper beam and being formed in a steel having an elastic limit which is at most equal to the elastic limit of the lower beam, which is at least equal to the elastic limit of the upper beam, and which is above 450 MPa.

4. The device as claimed in claim 1, in which the upper beam includes a flat which stretches along said upper beam and which forms an angle of less than 30 degrees with a plane in which the back panel lies, and in which at least one pair of tubular metal sockets is welded to the flat in order to take a pair of rods supporting a head restraint, each of the tubular sockets being arranged longitudinally in a vertical plane.

5. The device as claimed in claim 1, in which the upper beam includes a substantially flat lower face and the lower beam has a substantially flat upper face, these upper and lower faces being parallel to one another, and the uprights each having two axial ends which are welded respectively to said lower face and said upper face.

6. The device as claimed in claim 1, in which the lower beam and the upper beam together with the uprights consist of tubular sections.

7. A motor vehicle rear seat having a seat cushion and a backrest, the backrest including an armature device as claimed in claim 1.

8. The seat as claimed in claim 7, including three safety belts, namely two lateral safety belts and a central safety belt, this central safety belt having an upper part which is connected to the first frame by at least one anchoring point.

9. The seat as claimed in claim 8, in which the first frame includes a front face covered by a foam covering and a rear face to which is fixed a belt winder which constitutes the aforementioned anchoring point, the upper part of the central safety belt stretching upward from said winder, passing over the upper beam bearing against said beam and extending downward beyond the upper beam, this upper beam having a bearing surface which is its only surface in contact with said upper part of the central safety belt, and this bearing surface having no sharp edges.

10. The seat as claimed in claim 9, in which the bearing surface has, at every point in contact with the upper part of the central safety belt, a radius of curvature greater than two centimeters.

* * * * *